May 6, 1958 N. F. DAMON 2,833,158
KNOB LOCKING DEVICES
Filed May 26, 1955
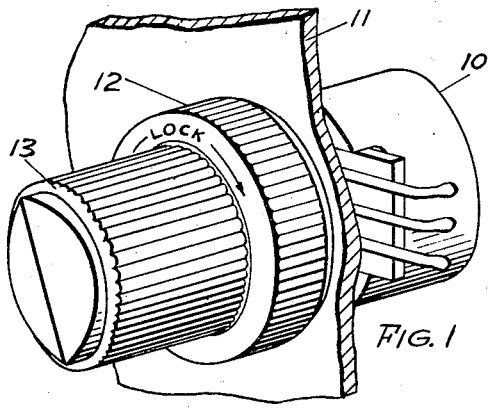
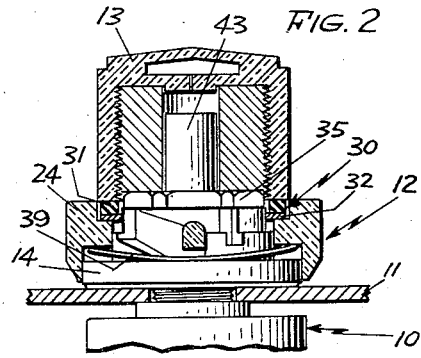
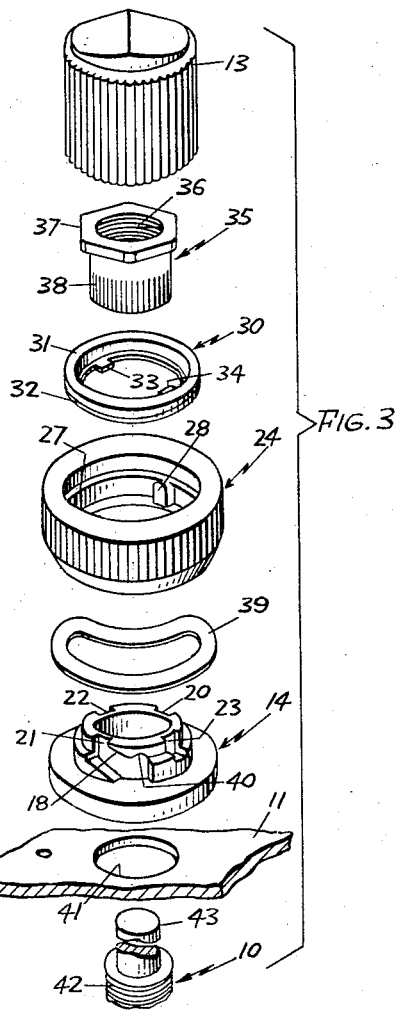
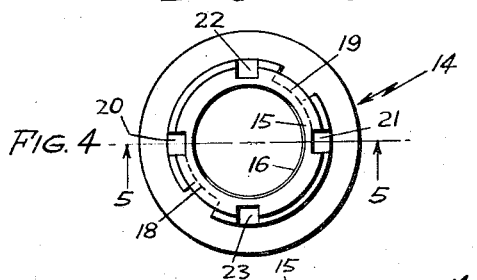
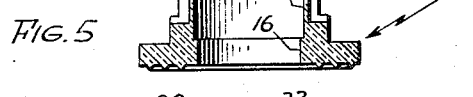
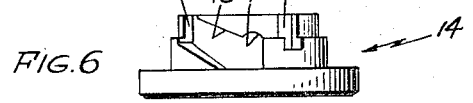
INVENTOR
NEIL F. DAMON
BY
ATTORNEY 2,833,158
Patented May 6, 1958

2,833,158

KNOB LOCKING DEVICES

Neil F. Damon, Watertown, Mass., assignor to Raytheon Manufacturing Company, Waltham, Mass., a corporation of Delaware Application May 26, 1955, Serial No. 511,208

1 Claim. (Cl. 74—504)

This invention relates to a knob locking device, and more particularly to a controllable locking device that frictionally engages a knob attached to a rotatable shaft, thereby effectively preventing rotation of said shaft.

This invention relates to a controllable locking device mounted axially with respect to a rotatable shaft that has a knob attached thereto. The suggested uses for such a locking device are potentiometers and controls, such as are found on electronic equipment. The locking device comprises a stationary member arranged to fixedly mount the member containing the rotatable shaft upon a panel, thereby eliminating the need for an external lock nut and lock washer. A movable member that controls the locking device operates upon said stationary member and is arranged to move in an axial direction depending upon the direction of rotation of said movable member. A friction-producing surface operated upon by said movable member is arranged to move in an axial direction only for frictionally engaging the knob on the shaft. Since the movable member is actually cammed in an axial direction by the action of camming surfaces between said stationary member and said movable member, a compressional spring is used to maintain contact between said stationary member and said movable member at the camming surfaces.

Further objects and advantages of this invention will be apparent as the description progresses, reference now being made to the accompanying drawing wherein:

Fig. 1 is a complete view of a potentiometer, panel, locking device, and knob;

Fig. 2 is a cross section of Fig. 1;

Fig. 3 is an exploded view of Fig. 1;

Fig. 4 is a top view of the stationary member;

Fig. 5 is section 5—5 of Fig. 4;

Fig. 6 is a side view of the stationary member;

Fig. 7 is a detailed view of the cross section illustrated in Fig. 5; and

Fig. 8 is a cross-sectional view of the movable member.

Referring now to Fig. 1, there is shown a potentiometer 10 mounted on a panel 11 by knob locking device 12. Knob 13 is attached to the rotatable shaft of potentiometer 10.

Referring now to Fig. 2, there is shown a cross section of panel 11, knob locking device 12, and knob 13. The stationary member 14 is constructed of a molded plastic and, by referring also to Figs. 4, 5, 6, and 7, it will be observed that the bore located axially in said stationary member is constructed of a larger size bore 15 and a smaller size bore 16. The side of said stationary member placed adjacent to panel 11 contains a plurality of rib sections 17 having a V-shaped cross section. Since the stationary member 14 fixedly mounts potentiometer 10 on panel 11, these V-shaped grooves 17 are deformed and act as a combination seal-and-lock washer upon assembly of the potentiometer on the panel. The raised center portion of said stationary member 14 contains a pair of internally cut cam surfaces 18 and 19 located diametrically opposed to each other. Access to these cam surfaces is obtained through a pair of vertically cut slots 20 and 21. Located at right angles to these slots is another pair of vertical slots 22 and 23.

Referring now to Figs. 2 and 8, there is shown a movable member 24, which is also constructed of a molded plastic material. That side of movable member 24 in contact with stationary member 14 has a central bore 25 having a depth determined by the cut of the cam surfaces 18 and 19 located on stationary member 14. The opposite side of movable member 24 has another axial bore 26 having a smaller diameter than bore 25 and of such a depth as to leave a collar 27 located on that portion of the material between bore 26 and bore 25. Located on the inside of movable member 24 between bore 25 and bore 26 are two vertical projections 28 and 29 located diametrically apart and of such a size as to fit within openings 20 and 21 and hence able to operate upon cam surfaces 18 and 19 of stationary member 14.

In Fig. 2 there is also illustrated a ring member 30 consisting of a friction producing rubber material 31 bonded to an aluminum base 32. Located on the internal diameter of an aluminum base material 32 are two radial projections 33 and 34 of such a size as to fit within openings 22 and 23 located on fixed member 14. Insert 35 is constructed of metal having internally cut threads 36, a hex nut head 37 and serrations 38 on the outside diameter for a length equal to the depth of bore 16, located on stationary member 14. The diameter of hex head 37 is such as to prevent the radial projections 33 and 34 of friction-producing surface 30 from passing over.

Referring now to Fig. 3, there is shown an exploded view of the locking device 12. The locking device is pre-assembled by placing spring 39 on stationary member 14 and then placing movable member 24 over stationary member 14 in such a manner that projections 28 and 29 slip into openings 20 and 21 leading to cam surfaces 18 and 19. At this point the assembly is made easier by rotating movable member 24 counterclockwise to the unlocked position such that projections 28 and 29 are cammed down and snapped into positions 40 and 40a, which are small cutaways at the end of cam surfaces 18 and 19 that provide a snapping action when the locking action is released. In the unlocked position, friction-producing surface 30 is placed on top of the assembled stationary member 14 and movable member 24 in such a manner that radial projections 33 and 34 slide into vertical openings 22 and 23 of stationary member 14. The complete assembly can now be locked together as a unit by inserting insert 35 into the central opening of stationary member 14 in such a manner that the serrations 38 enter the large bore 15. Since bore 15 is larger in diameter than the serrations 38, insert 35 will move until the serrations contact the smaller bore 16. In order to complete the operation, a small arbor press is needed to forceably cause the serrations 38 of insert 35 to cut into bore 16 of stationary member 14. The locking device is now completely assembled and ready for operation. In order to mount potentiometer 10 to panel 11, it is only necessary to place the potentiometer through hole 41 and then thread the internally-threaded portion 36 of insert 35 onto the threaded collar 42 located on potentiometer 10. A suitable box wrench is used to tighten the locking device onto the potentiometer. Since in the process, as previously mentioned, the V-shaped rib sections 17 located on that side of stationary member 14 closest to panel 11 will be caused to spread, thereby effectively locking the potentiometer to panel 11, and also sealing said potentiometer. The lock assembly 12 will now securely hold potentiometer 10 to panel 11 and it is only necessary to attach knob 13 to the rotatable shaft 43 of said potentiometer. It can be seen, therefore, that when it is desired to lock the shaft 43 of the potentiometer 10, it is only necessary to rotate to movable member 24 of locking device 12 a quarter turn, until camming surfaces 18 and 19 on fixed member 14 push movable member 24 in an axial direction which, in turn, causes collar 27 to bear against the aluminum backing 32 of friction-producing surface 30, which, in turn, causes rubber material 31 to bear against knob 13 and thereby effectively preventing shaft 42 from rotating. Since radial inserts 33 and 34 of friction-producing surface 30 are free to move only in an axial direction, due to the limitations of slots 22 and 23, locking and unlocking device 12 will not cause rotation of knob 13.

This completes the description of the embodiment illustrated herein. However, this invention is not limited to the particular details of construction, materials and processes described, as many equivalents will suggest themselves to those skilled in the art. It is accordingly desired that the appended claim be given a broad interpretation commensurate with the scope of the invention within the art.

What is claimed is:

In combination, a first member having a rotatable shaft and a knob attached to said shaft, and a controllable locking device mounted axially with respect to said shaft, said locking device comprising a stationary member arranged to fixedly mount said first member upon a panel, a first movable member operating upon said stationary member and arranged to move in an axial direction by cam action contacting said stationary member and said first movable member depending upon the direction of rotation of said first movable member, a second movable member having a friction-producing surface and movable in an axial direction only and operated upon by said first movable member for frictionally engaging said knob on said shaft, and a spring operating upon said first movable member for causing said first movable member and said stationary member to contact each other.

References Cited in the file of this patent

UNITED STATES PATENTS

| | | |
|---|---|---|
| 2,318,815 | Stuart | May 11, 1943 |
| 2,642,503 | Dietrich | June 16, 1953 |
| 2,704,466 | Way | Mar. 22, 1955 |